United States Patent [19]
Sakalay

[11] 3,882,325
[45] May 6, 1975

[54] MULTI-CHIP LATCHING CIRCUIT FOR AVOIDING INPUT-OUTPUT PIN LIMITATIONS

[75] Inventor: Fred Elias Sakalay, Poughkeepsie, N.Y.

[73] Assignee: International Business Machines Corporation, Armonk, N.Y.

[22] Filed: Dec. 10, 1973

[21] Appl. No.: 423,627

[52] U.S. Cl. ................. 307/218; 307/207; 307/215
[51] Int. Cl. ............................................ H02k 17/00
[58] Field of Search ........... 307/215, 218, 207, 235; 328/52

[56] References Cited

UNITED STATES PATENTS

| | | | |
|---|---|---|---|
| 3,588,545 | 6/1971 | Wright | 307/218 |
| 3,679,915 | 7/1972 | Kriger | 307/218 |
| 3,753,009 | 8/1973 | Clapper | 307/215 |

OTHER PUBLICATIONS

Application of Boolean Algebra to Switching Circuits by Washburn, 9/53.

*Primary Examiner*—Michael J. Lynch
*Assistant Examiner*—B. P. Davis
*Attorney, Agent, or Firm*—Robert J. Haase

[57] ABSTRACT

A multi-chip latching circuit comprising first and second chips each including a respective latching circuit and a third chip including a logic circuit which functions as an OR circuit for rising input signals and as an AND circuit for falling input signals. The output signals from the first two chips provide the input signals to the third chip. The three chips, in combination, act as a single composite latching circuit responsive to a plurality of set signal inputs and a plurality of reset signal inputs. The total number of set and reset signal inputs, are divided between the first and second chips with one chip receiving at least one set signal and its associated reset signal and the other chip receiving the remainder of the total number of set and reset signal inputs. There is no direct signal connection between the first and second chips.

9 Claims, 3 Drawing Figures

MULTI-CHIP LATCHING CIRCUIT FOR AVOIDING INPUT-OUTPUT PIN LIMITATIONS

BACKGROUND OF THE INVENTION

In the design of logic systems, a point is reached in the layout of the individual units such as semiconductor chips, cards, boards or gates when the circuits desired to be located on the unit begin to exceed the available space. For example, the space available at the perimeter of the unit for input-output pin connections might be inadequate. In other instances, the total space available on the unit may be insufficient to lay out the entire circuit. Both problems can be relaxed by sub-dividing the desired logic circuit into two units. A special consideration arises when the desired circuit contains a latch which is to be subdivided into a constituent latch on each of the first and second chips. By simply combining the outputs of the constituent latches, the combined output would go "up" when both of the constituent latches are set. However, the combined output would not go "down" when only one of the constituent latches is reset. Thus, the aforesaid simple combination of the two constituent latches is not the functional equivalent of a single multi-input latching circuit whose output would go "up" upon the occurrence of one or more set signals and "down" upon the occurrence of any one reset signal.

SUMMARY OF THE INVENTION

A pair of constituent latching circuits, each receiving respective associated set and reset input signals and producing an output signal representing its status, are coupled to a logic circuit to comprise a composite circuit functionally equivalent to a single latching circuit directly receiving all of the set and reset signals. The output signals of the two constituent latching circuits are applied as input signals to the logic circuit. The output signal produced by the logic circuit goes up upon the occurrence of one or more set signals at the input of either one of the constituent latching circuits and goes down upon the occurrence of any one reset signal at the input of either one of the constituent latching circuits.

A feature of the invention is the logic circuit which functions as a positive OR circuit for rising input signals and as a positive AND circuit for falling input signals.

DESCRIPTION OF THE PREFERRED EMBODIMENT

Figures 1, 2, 3:
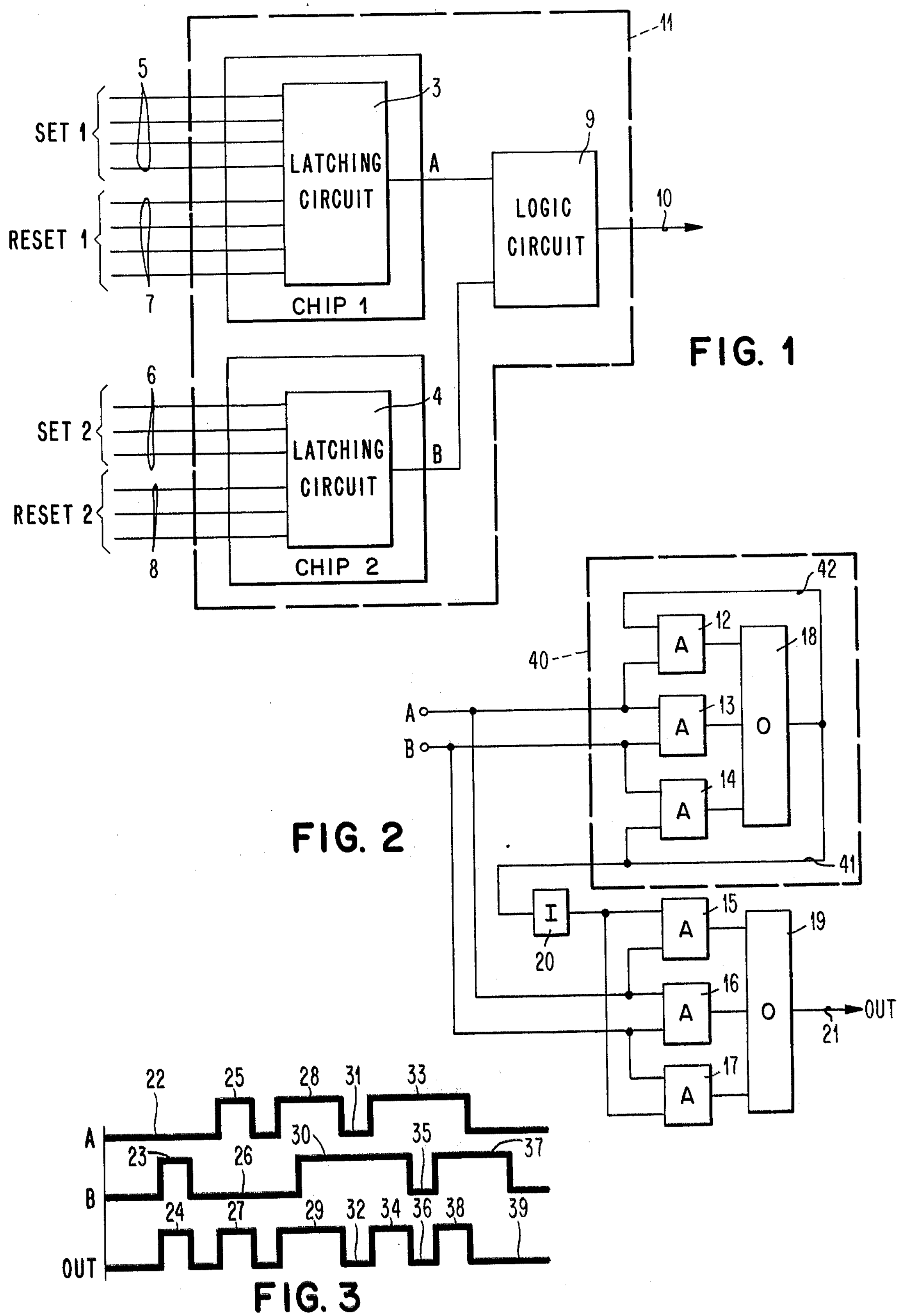
FIG. 1 is a simplified block diagram showing the signal flow between the constituent latching circuits and the logic circuit constituting the composite latching circuit of the present invention.
FIG. 2 is a simplified block diagram of the logic circuit of FIG. 1.
FIG. 3 is a series of idealized waveforms appearing at the inputs and output of the logic circuit of FIG. 2.

Referring to FIG. 1, semiconductor chips 1 and 2 include respective constituent latching circuits 3 and 4. Each latching circuit receives a respective plurality of set input signals 5 and 6 and a respective plurality of reset input signals 7 and 8. By way of example, four set and reset signals are applied to latch 3 while three set and reset signals are applied to latch 4. It will be understood that the relative distribution of the set and reset signals applied to the two chips is a matter of design convenience. The use of semiconductor chips 1 and 2 in the disclosed embodiment is purely exemplary. More broadly, the chips represent any individual units of an overall logic system including but not limited to chips, cards, boards or gates.

The output signals A and B representing the states of the respective latches 3 and 4 are applied as input signals to logic circuit 9. The output from circuit 9 on line 10 represents the state of a composite latching circuit represented by dotted block 11 and comprising constituent latching circuits 3 and 4 and logic circuit 9 in combination. The composite circuit 11 is functionally equivalent to a single latching circuit that receives all of the set and reset input signals 5–8 in that the output signal on line 10 goes up upon the occurrence of one or more of the set signals on any of the lines 5 and 6 and goes down upon the occurrence of any one of the reset signals on any of the lines 7 and 8.

It should be noted that there is a particular reset signal associated with each respective set signal. For example, consider that the composite latching circuit 11 constitutes one stage of a data register receiving inputs from a plurality of keyboards which are actuated at respective times. In such a case, each latch would receive a set and reset signal from each keyboard. As a matter of definition, the set and the reset input signals from the same keyboard are termed an associated pair of set and reset signals. Although the total number of set and reset signals received by composite latching circuit 11 is subdivided between latching circuits 3 and 4 on chips 1 and 2, respectively, sub-division cannot be made between an associated pair of set and reset signals. That is, each associated pair of set and reset signals must be applied to the same one of the latching circuits 3 and 4.

It will be seen that the functional equivalent of composite latching circuit 11 cannot be achieved merely by summing the output signals A and B from chips 1 and 2. For example, in the event that latches 3 and 4 were both set, the combined output signal would go up as desired. However, if either but not both of latches 3 and 4 then was reset, the combined output signal would remain up which is not the desired result. In accordance with the present invention, the output signal of the composite latching circuit 11 on line 10 is caused to go down in the aforementioned case by the use of logic circuit 9.

Referring to FIG. 2, logic circuit 9 comprises AND gates 12–17, OR gates 18 and 19 and inverter 20. Output signals A and B from chips 3 and 4, respectively, of FIG. 1, are applied directly to AND gates 13 and 16. Signal A also is applied to AND gates 12 and 15 while signal B also is applied to AND gates 14 and 17. The outputs of AND gates 12, 13 and 14 are applied to OR gate 18. The outputs of AND gates 15, 16 and 17 are applied to OR gate 19. The output of OR gate 18 is applied to AND gate 12 and 14 and, via inverter 20, to AND gates 15 and 17. AND gates 13 and 16 are shown as two separate units to aid in the following description of operation of logic circuit 9 of FIG. 2. Inasmuch as gates 13 and 16 receive the same input signals and produce equivalent output signals, the two gates may be combined as one structure.

The waveforms of FIG. 3 depict the operation of the overall logic circuit 9 of FIG. 2. Initially both waveforms A and B are down and the outputs of all AND and OR gates are also down. If waveform A is down (22) and waveform B is up (23), the outputs of AND gates 12, 13 and 14 are down and the output of OR gate 18 is down. However, the inverted output of OR gate 18 is applied to AND gates 15 and 17 causing the output of AND gate 17 to go up and the output (24) of OR gate 19 on line 21 to go up. Similarly, when waveform A is up (25) and waveform B is down (26), the output of inverter 20 is up causing the output of AND gate 15 to go up and the output (27) on line 21 to go up. The same action repeats in response to the rising edge of pulse 28 of waveform 8 after both waveforms A and B had returned to their down level.

Output (29) remains at its up level following the rising edge of pulse 30 of waveform B but returns to its down level (32) upon the occurrence of the falling edge of pulse 28 of waveform A. The last named action occurs in the following manner. When waveforms A and B are both up (28) and (30), the outputs of AND gates 13 and 16 are both up and the output (29) on line 21 is up. The outputs of AND gates 12 and 14 also are up due to the feedback connections 41 and 42 from the output of OR gate 18. When pulse 28 of waveform A falls, the output of AND gate 13 falls but the output of OR gate 18 remains up because the output of AND gate 14 remains up as long as waveform B maintains its up level. Inasmuch as the output of OR gate 18 remains up, the output of inverter 20 remains down precluding conduction of AND gates 15 and 17. Thus, when waveform A goes down (31), conduction of the remaining AND gate 16 ceases and the output (32) on line 21 goes down.

When waveform A again goes up (33) while waveform B remains up (30), conduction of AND gate 16 is restored causing the output (34) to go up. Upon the further event that waveform B goes down (35), the output from OR gate 18 remains up due to the continued conduction of AND gate 12 and the output of inverter 20 goes down precluding conduction of AND gates 15 and 17. Conduction of remaining AND gate 16 also ceases when waveform B goes down (35) with the result that the output (36) on line 21 also goes down. When waveform B again goes up (37), conduction of AND gate 16 is restored and the output (38) on line 21 goes up. The falling edge of pulse 33 of waveform A terminates conduction of AND gate 16 while AND gate 15 and 17 remain nonconductive due to the continued conduction of AND gate 14 and the output (39) goes down. Finally, the output remains down when pulse 37 of waveform B falls.

From the foregoing detailed description of the operation of the logic circuit of FIG. 2, it can be seen that the logic circuit functions as a positive OR gate for rising edges of waveforms A or B and functions as a positive AND gate for falling edges of waveforms A and B. Such dual functioning is determined by the state of the latching circuit 40 comprising AND gates 12, 13 and 14 and OR gate 18. Said latching circuit is set when both inputs A and B are up and is reset when both inputs A and B are down. While the latch is set, the logic circuit of FIG. 2 functions as a positive AND circuit, i.e., the output on line 21 goes down when either waveform A or B goes down. While the latch is reset, the logic circuit of FIG. 2 functions as a positive OR circuit, i.e., the output on line 21 goes up when either waveform A or B goes up. Once the latch is set by the simultaneous up level of waveforms A and B, it remains set until both waveforms A and B are at their down levels simultaneously.

It will be noted that two constituent latching circuit chips 3 and 4 are shown in the exemplary embodiment of FIG. 1. In accordance with the broad aspect of the present invention, however, the composite latching circuit 11 may be subdivided into any number of constituent latching circuit chips depending upon the space and layout considerations confronting the designer. In the event that additional constituent latching circuit chips are to be used, logic circuit 9 can be extended readily to accommodate the corresponding additional input signals thereto.

AND gates 13 and 16 always receive the output signals from all of the constituent latching circuit chips employed. For each additional input signal in excess of inputs A and B, there is also provided two corresponding additional two input AND gates similar to AND gates 12–17 of FIG. 2. The first of the additional two input AND gates receives the corresponding additional input signal and the output from OR gate 18. The second of the additional two input AND gates receives the corresponding additional input signal and the output from inverter 20. The output of said first AND gate is applied to OR gate 18. The output of said second AND gate is applied to OR gate 19.

While this invention has been particularly described with reference to the preferred embodiments thereof, it will be understood by those skilled in the art that the foregoing and other changes in form and details may be made therein without departing from the spirit and scope of the invention.

What is claimed is:

1. A composite latching circuit receiving a plurality of set signals and a plurality of reset signals comprising:

a first constituent latching circuit receiving at least one of said set signals and the associated one of said reset signals, a second constituent latching circuit receiving the remainder of said plurality of set and reset signals, each said constituent latching circuit providing an output signal representing the state thereof, and a logic circuit operative as a positive OR circuit for input signal amplitude changes in one direction and as a positive AND circuit for input signal amplitude changes in the opposite direction, said output signal from each said constituent latching circuit being applied to said logic circuit as said input signals.

2. The composite latching circuit defined in claim 1 wherein said one direction is a rising direction and said opposite direction is a falling direction.

3. The composite latching circuit defined in claim 1 wherein said logic circuit comprises:

a third latching circuit receiving said output signals from said first and second constituent latching circuits, said third latching circuit being set when both said output signals are of a first amplitude and being reset when both said output signals are of a second amplitude, first, second and third AND gates, an OR gate, and an inverter, the output of said third latching circuit being coupled to said first and third AND gates by said inverter, said output signal from one of said constituent latching circuits being applied to said first and second AND gates, said output signal from the other of said constituent latching circuits being applied to said second and third AND gates, and the output of said first, second and third AND gates being coupled to said OR gate.

4. The composite latching circuit defined in claim 3 wherein said first amplitude is high relative to said second amplitude.

5. The composite latching circuit defined in claim 3 wherein said third latching circuit comprises:

fourth, fifth and sixth AND gates and a second OR gate, said output signal from one of said constituent latching circuits being applied to said fourth and fifth AND gates, said output signal from the other of said constituent latching circuits being applied to said fifth and sixth AND gates, the output of said fourth, fifth and sixth AND gates being coupled to said second OR gate, and the output of said second OR gate being coupled to said fourth and sixth AND gates and to said inverter.

6. The composite latching circuit defined in claim 5 wherein said second and fifth AND gates are combined as one structure.

7. A logic circuit operative as an OR circuit for input signal amplitude changes in one direction and as an AND circuit for input signal amplitude changes in the opposite direction, said logic circuit comprising:

a latching circuit receiving first and second input signals, said latching circuit being set when both said input signals are of a first amplitude and being reset when both set input signals are of a second amplitude, first, second and third AND gates, an OR gate, and an inverter, the output of said latching circuit being coupled to said first and third AND gates by said inverter, one of said input signals being applied to said first and second AND gates, the other of said input signals being applied to said second and third AND gates, and the output of said first, second and third AND gates being coupled to said OR gate.

8. The logic circuit defined in claim 7 wherein said latching circuit comprises:

fourth, fifth and sixth AND gates and a second OR gate, said one input signal being applied to said fourth and fifth AND gates, said other input signal being applied to said fifth and sixth AND gates, the output of said fourth, fifth and sixth AND gates being coupled to said second OR gate, and the output of said second OR gate being coupled to said fourth and sixth AND gates and to said inverter.

9. The latching circuit defined in claim 8 wherein said second and fifth AND gates are combined as one structure.

* * * * *